Patented May 4, 1948

2,440,800

UNITED STATES PATENT OFFICE 2,440,800

HALOGENATED HYDROCARBONS AND METHOD FOR THEIR PREPARATION

William E. Hanford, Wilmington, and Robert M. Joyce, Jr., Marshallton, Del., assignors to E. I. du Pont de Nemours & Company, Wilmington, Del., a corporation of Delaware No Drawing. Application April 10, 1942, Serial No. 438,466

20 Claims. (Cl. 260—658)

This invention relates to a new type of reaction and to the products resulting therefrom.

The novelty of this reaction is such that, for adequate description, it has been found necessary to coin new terms to describe the reaction and the participants therein. The reaction has been called "telomerization" (from Greek telos, meaning "end" plus Greek mer meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers" having the formula $Y(A)_nZ$ wherein $(A)_n$ is a divalent radical formed by chemical union, with the formation of new carbon bonds, of $n$ molecules of the taxogen, the unit A being called a "taxomon," $n$ being any integer greater than one, and Y and Z being fragments of the telogen attached to the terminal taxomons.

This invention pertains to the application of this reaction to polymerizable aliphatic monoolefinic hydrocarbons. By the term "polymerizable aliphatic monoolefinic hydrocarbon" is meant any such hydrocarbon which can be polymerized in the presence of benzoyl peroxide.

This novel reaction of a polymerizable aliphatic monoolefinic hydrocarbon, such as ethylene, can be conducted under conditions similar to those used for the polymerization of the hydrocarbon; e. g., those described for the polymerization of ethylene in U. S. Patents 2,133,553, 2,388,225, 2,396,785, 2,395,327, 2,396,677, all filed March 15, 1941. The inclusion in the reaction mixture of the telogen, however, so alters the course of the reaction that there are produced, instead of polyethylene, products differing from polyethylene in chemical composition and having a lower average molecular weight than the polyethylene formed in the absence of the telogen.

Telomerization is not to be confused with interpolymerization. It is known to the art that, under conditions similar to those employed for the polymerization of ethylene as described above, it can be interpolymerized with a wide variety of unsaturated compounds. In this reaction, a number of molecules of each reactant enter into the formation of each polymer chain, and the resulting product is a high molecular weight polymeric material. In telomerization reactions, however, only one molecule of the telogen enters into the formation of each molecular species and the average molecular weight of the product is, in general, considerably lower than that of an interpolymer formed under comparable conditions. Just as in the polymerization of ethylene, a portion of the ethylene can be replaced with another unsaturated compound to form modified polymers or interpolymers, so also in telomerization, a portion of the ethylene can be replaced by another unsaturated compound to form modified telomers. These modified telomers, as in the case of the simple telomers, will contain but one unit of the telogen per molecule of the telomer and will have lower average molecular weights than would have been obtained in the absence of the telogen.

It is an object of this invention to produce new chemical compounds. Another object is to provide a process for reacting a saturated estadride of an inorganic acid with more than one unit of a polymerizable aliphatic monoolefinic hydrocarbon to produce telomers. A further object is to discover suitable conditions for this reaction. Other objects will appear hereinafter.

It has now been found that the object of the invention can be attained by reacting a saturated estadride i. e., an ester or anhydride, of an inorganic acid with a polymerizable aliphatic monoolefinic hydrocarbon under conditions which would normally give rise to polymerization of the latter, in the presence of an agent which is effective as a catalyst for the polymerization of the olefinic hydrocarbon, but ineffective as a catalyst for the Friedel-Crafts reaction; e. g., the reaction of ethyl chloride with benzene. This type of catalyst can be properly called a "telomerization catalyst." By the term "estadride" is meant an ester or an anhydride of an actual or hypothetical acid. This term is a contraction derived from "ester" and "anhydride." The invention may also be described as the subjection of a reaction mass comprising a polymerizable monoolefinic aliphatic hydrocarbon and a member of the group consisting of saturated esters and saturated anhydrides of inorganic acids at a superatmospheric pressure of the olefine and preferably at an olefine pressure of 20–1000 atmospheres to the action of a superatmospheric temperature, generally 60° C. to 150° C., and of a polymerization catalyst ineffective in the Friedel-Crafts reaction, e. g., benzoyl peroxide. The term "saturated," when used to modify "estadride" in this specification and claims, means that the estadride is free from aliphatic carbon-to-carbon unsaturation.

In carrying out the process of this invention using a typical aliphatic monoolefinic hydrocarbon, such as ethylene, with a typical telogen, such as, for example, carbon tetrachloride, chloroform, trichloroacetic acid, etc., it is preferred to operate at superatmospheric pressure, and pressure apparatus must, accordingly, be employed when operating under the preferred conditions. The apparatus consists, in its essential parts, of a pressure reactor capable of being heated, and equipped with means of agitating the reactants, with an inlet line for admitting gaseous ethylene, a vent connected to a safety rupture disc, and a pressure gage. The liquid charge is placed in the reactor, consisting of telogen, water, and/or inert organic solvent, such as isooctane, benzene, cyclohexane, etc., and catalyst, which is preferably a diacyl peroxide or an alkali or ammonium persulfate and is generally employed in the amount of about 1/700 of a molecular equivalent, based on the quantity of telogen employed. The reactor is then closed, the contents are agitated by suitable means such as by stirring with an internal stirrer or by agitating the reactor, and ethylene under pressure is admitted. The amount of ethylene so employed is regulated so that the desired pressure will be achieved at reaction temperature, which is generally somewhere between 60° C. and 150° C. The preferred pressure range is between 20 and 1000 atmospheres, the exact pressure employed depending somewhat upon the reactants used and upon the average molecular weight of product desired.

When benzoyl peroxide is used as catalyst, the reaction usually sets in at about 60° C. to 100° C. as is indicated by a drop in pressure registered on the gage attached to the reactor. It is preferable, although not essential, to maintain the desired reaction pressure by admitting additional ethylene from a storage cylinder as the reaction proceeds. If insufficient agitation is employed, the reaction may be accompanied by a marked temperature rise in the reaction mixture. The use of insufficient diluent, e. g., water, in the reaction mixture may also occasion such a temperature rise. In the absence of a diluent, the reaction between ethylene and carbon tetrachloride may proceed with explosive violence unless it is carefully controlled. To avoid this, it is preferred to employ at least one-sixth as much water as telogen, and, in many cases, to employ an equal weight of water, except in those cases where the telogen is water sensitive. Because of its high specific heat, water serves as an excellent heat dissipating medium. When water-sensitive telogens are employed, it is preferable to employ an inert organic diluent.

The end of the reaction is indicated by the cessation of ethylene absorption. When this point is reached, the reaction mixture is allowed to cool, removed from the reactor, and worked up to isolate the resulting products. As a general rule, the telogen is used in excess and a considerable proportion of it remains unreacted at the end of the reaction. If the telogen happens to be a water-immiscible liquid, the products are generally soluble in it and may be isolated by separating the water from the reaction mixture and evaporating the more volatile telogen from the less volatile products.

It must be emphasized that, in all cases, the products produced by this reaction are not a single molecular species, but are a mixture of structurally homologous compounds differing from one another by one or more taxomons. Thus, when the telogen is $WCX_3$, where $X$ is halogen and $W$ is hydrogen or halogen, and the taxogen is an alpha olefine of the formula

where R and R' are hydrogen or hydrocarbon radicals, the products have the general formula

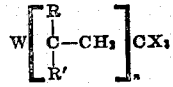

where $n$ is an integer. The telomers, of course, are the compounds in which $n$ is greater than unity. For example, when ethylene is reacted by the process of this invention with carbon tetrachloride, a mixture of compounds of the formula $Cl(CH_2CH_2)_nCCl_3$ is obtained where $n$ is an integer. When the reaction of this invention is carried out at 60 to 120 atmospheres, this mixture consists primarily of products containing 2, 3 and 4 ethylene units. When ethylene is reacted by the process of this invention with chloroform, the products formed have the general structure $H(CH_2CH_2)_nCCl_3$ where $n$ is an integer. When chloroiodomethane is employed with ethylene, the products are alpha-chloro-omega-iodoalkanes, i. e., products of the structure $Cl(CH_2CH_2)_nCH_2I$, where $n$ is an integer.

The low molecular weight constituents of such telomer mixtures can often be separated into pure organic compounds by fractional distillation. This process is applicable to all telomer mixtures which can be distilled without decomposition. The process is particularly simple because the various constituents of the mixture differ from each other by at least two carbon atoms, leading to fairly large differences in boiling points. Other methods for separating the products can also be used in many cases, e. g., fractional crystallization, sublimation, selective extraction, etc.

Some product mixtures are not readily amenable to separation into their component parts. For a great many applications, however, the product mixture can be employed per se, since it is a mixture of functionally identical compounds differing from one another only in the number of taxomons in the chain between the functional groups.

A very important feature of the process of the present invention when a single telogen and taxogen are used is that it produces a mixture of structurally homologous compounds. To illustrate, the reaction, by the process of this invention, of ethylene and chloroform always produces a mixture of compounds of the formula $H(CH_2CH_2)_nCCl_3$. No isomers, such as

or compounds such as $Cl_3C(CH_2CH_2)_nCCl_3$ are formed. This means that the reaction mixture reacts essentially as a pure compound and can be employed as such for many purposes.

For a given ester or anhydride, the average chain length of the telomer mixture depends on the relative concentrations of olefine and telogen. Thus, increasing the concentration of the taxogen relative to that of the ester or anhydride, for example, by increasing the pressure of the olefine in the reaction mixture or by employing an inert diluent, increases the average molecular weight or chain length of the products.

The average chain length of the product mixture is also a function of the ester or anhydride employed. For example, under comparable conditions, using the same olefine, the average chain length of the products formed when carbon tetrachloride is used is somewhat shorter than that of those formed using chloroform, and both of these are considerably shorter than the chain length of the products formed using trichloroacetic acid.

In some telomerizations, a portion of the product consists of the 1:1 addition compound of telogen to taxogen. In the case of ethylene/carbon tetrachloride, for example, the compound $ClCH_2CH_2CCl_3$ is formed as a by-product. Such compounds are not considered telomers.

In order that the process may be more fully understood, the following specific examples are given by way of illustration, but the invention is not limited thereto as will become more apparent hereinafter.

Wherever the term "parts" is used, it is intended to mean "parts by weight."

Example I

A stainless steel autoclave equipped with an internal stirrer is charged to about 70 per cent of its capacity with 5530 parts of water, 5530 parts of carbon tetrachloride, and 12.5 parts of benzoyl peroxide. The autoclave is connected to an ethylene storage cylinder and is equipped with a bleed-off valve. It is flushed twice with ethylene to remove most of the atmospheric oxygen. Stirring is started and an ethylene pressure of 600 pounds per square inch is placed on the charge. The temperature is raised to 95° C. and the pressure is prevented from rising above 1800 to 1850 pounds per square inch by bleeding off ethylene as the temperature rises. At about 95° C., an exothermic reaction sets in causing the temperature to rise to 150° C. in 3 minutes. During this time, ethylene is absorbed rapidly, and the pressure is maintained at 1650–1750 pounds per square inch only by admitting additional ethylene from the storage cylinder. After the temperature reaches 150° C., it drops off again, and the ethylene absorption becomes less marked, ceasing altogether in about ½ hour.

The reaction mixture is cooled, the pressure is released, and the product is removed from the reactor. The carbon tetrachloride layer is separated from the water and is washed with water, 10 per cent sodium carbonate solution, and water. The carbon tetrachloride is removed in a stripping still, and the resulting product is separated into its individual components by fractional distillation. The results of fractionating the combined products from four such runs are shown in Table I.

Table I

| Cut | B. P., °C. | No. of Carbons | Parts by Weight | Weight, per cent |
|---|---|---|---|---|
| 1 | 58–60°/24 mm | $C_3$ | 992 | 10.04 |
| 2 | 60–111°/24 mm | Mixed | 123 | 1.24 |
| 3 | 111–113°/24 mm | $C_5$ | 5,277 | 53.47 |
| 4 | 113–142°/24 mm | Mixed | 230 | 2.33 |
| 5 | 142–144°/24 mm | $C_7$ | 2,142 | 21.72 |
| 6 | 144°/24 mm.–167°/20 mm | Mixed | 229 | 2.32 |
| 7 | 167–169°/20 mm | $C_9$ | 363 | 3.68 |
| Residue | | $C_9$ | 513 | 5.20 |
| | | | 9,869 | 100.00 |

The properties of the pure compounds (cuts 1, 3, 5, and 7) are tabulated below:

Table II

| Cut | C | H | Cl | Empirical Formula | $n_D^{25}$ | $d_4^{25}$ | $M_r$ Calc. | $M_r$ Obs. |
|---|---|---|---|---|---|---|---|---|
| 1 | | | 77.16 | $C_3H_4Cl_4$ | 1.4794 | 1.4463 | 35.70 | 35.71 |
| 3 | 28.78 | 3.75 | 67.70 | $C_5H_8Cl_4$ | 1.4859 | 1.3416 | 44.91 | 44.93 |
| 5 | 35.40 | 5.19 | 59.90 | $C_7H_{12}Cl_4$ | 1.4824 | 1.2535 | 54.11 | 54.17 |
| 7 | | | | $C_9H_{16}Cl_4$ | 1.4804 | 1.1943 | 63.22 | 63.32 |

The structures of these compounds were established as follows:

Cut 1, $C_3H_4Cl_4$, was treated with concentrated sulfuric acid at 95° C. for 1.5 hours; HCl was evolved copiously. The resulting homogeneous solution was cooled, poured on ice, and extracted with ether. From the ether extract, there was isolated beta-chloropropionic acid, boiling at 110° C./20 mm.; melting point, 40–42° C. This behavior proves the structure $ClCH_2CH_2CCl_3$ for this compound.

This mono-addition product of carbon tetrachloride to ethylene is not considered a telomer, since it contains but one ethylene unit. Such by-products are often formed in telomerization reactions.

Cut 3, $C_5H_8Cl_4$, on similar treatment with concentrated sulfuric acid, yielded an acid boiling at 122.5–125° C./8 mm. which had a neutral equivalent of 136.2; the calculated neutral equivalent for a chlorovaleric acid is 136.5. The structure of the acid was shown by heating a methanol solution of its sodium salt. After filtration of the separated sodium chloride, the solution was distilled to yield the known delta-valerolactone which boiled at 92° C./8 mm., $n^{26}$—1.4450. This was converted to the known hydrazide of 5-hydroxy-valeric acid which melted at 105° C. This series of reactions proves that the compound $C_5H_8Cl_4$ has the structure $Cl(CH_2)_4CCl_3$.

Cut 5, $C_7H_{12}Cl_4$, on treatment with concentrated sulfuric acid at 95° C., yielded an acid which boiled at 136–137° C./5 mm. and had a neutral equivalent of 165.2. The calculated neutral equivalent for a chloroheptanoic acid is 164.5. The sodium salt of this acid was treated with sodium cyanide, and the resulting product was hydrolyzed with potassium hydroxide. Acidification yielded suberic acid (a known material) which, after recrystallization from water, melted at 138–140° C. and had a neutral equivalent of 86.4. This series of reactions establishes the structure $Cl(CH_2)_6CCl_3$ for the tetrachloroheptane.

It is thus established that the reaction, by the process of this invention of ethylene with carbon tetrachloride gives rise to a series of compounds of the general formula $Cl(CH_2CH_2)_nCCl_3$.

Under similar conditions, low molecular weight products can be prepared from ethylene and chloroform. The properties of these are given in the following table:

Table III

| Compound | B. P., °C. | $n_D^{25}$ | $d_4^{25}$ |
|---|---|---|---|
| $CH_3(CH_2)_3CCl_3$ | 87°/74 mm | 1.4530 | 1.1847 |
| $CH_3(CH_2)_5CCl_3$ | 126°/77 mm | 1.4558 | 1.1186 |
| $CH_3(CH_2)_7CCl_3$ | 129°/11 mm | 1.4583 | 1.0782 |

The structures of these compounds were established by hydrolysis with concentrated sulfuric acid at 95° C. to the corresponding normal aliphatic acids (valeric, heptanoic, and nonanoic) which were identified by appropriate derivatives. It is thus established that the reaction, by the process of this invention of ethylene with chloroform gives rise to a series of products of the general formula $H(CH_2CH_2)_nCCl_3$.

EXAMPLE II

The molecular size distribution of the individual products in the ethylene/carbon tetrachloride reaction product can be varied by altering the relative concentrations of the two reactants. Increasing the ethylene pressure increases the concentration of ethylene with respect to carbon tetrachloride and would thus be expected to increase the relative proportion of high molecular weight products in the reaction mixture. The following example confirms this hypothesis:

A stainless steel-lined reactor is charged with a mixture of 100 parts of water, 100 parts of carbon tetrachloride, and 0.23 part of benzoyl peroxide, the charge occupying about 40 per cent of the reactor volume. The reactor is agitated and pressured with 100 atmospheres of ethylene. The temperature is raised to 110° C., the pressure rising to 230 atmospheres. A reaction sets in causing the temperature to rise to 116° C. in 15 minutes while the pressure drops to 160 atmospheres. Additional ethylene is added and over the next 10.5 hours another 160 atmospheres of ethylene is absorbed in the pressure range of 250–300 atmospheres.

The product is isolated as in Example 1. The distribution of the various products is shown in Table IV.

Table IV

| No. of Carbons | Parts by Weight | Weight, Per cent |
|---|---|---|
| $C_3$ | 0.5 | 0.9 |
| $C_5$ | 12.7 | 24.1 |
| $C_7$ | 13.0 | 24.6 |
| $C_9$ | 11.5 | 21.8 |
| $C_{11}$ | 5.6 | 10.6 |
| $>C_{11}$ | 9.5 | 18.0 |
|  | 52.8 | 100.0 |

A comparison with the distribution of products in Example I (Table I) shows the effect of increased pressure.

EXAMPLE III

It has been pointed out in Example II that the molecular size distribution of the individual products in a reaction, by the process of this invention, is a function of the relative concentrations of the reactants. When one of the reactants is a gas which is used to maintain the reaction pressure, such as ethylene, these concentrations can be varied by using an inert solvent in the reaction mixture. For example, in the ethylene/carbon tetrachloride reaction, by the process of this invention, the addition of isooctane will dilute the carbon tetrachloride and, since isooctane is a solvent for ethylene, the concentration of ethylene relative to carbon tetrachloride will be increased at a given ethylene pressure and the molecular size distribution of the products should be shifted toward a longer average chain length.

A stainless steel shaker tube is charged with 54 parts of carbon tetrachloride, 87.5 parts of pure isooctane, 30 parts of water, and 0.24 part of benzoyl peroxide, the charge occupying about 50 per cent of the reactor volume. The tube is evacuated to remove most of the atmospheric oxygen and is then agitated and pressured with 600 pounds per square inch of ethylene. The temperature is raised to 110° C., the pressure rising to 1800 pounds per square inch, where a reaction sets in characterized by absorption of ethylene. Pressure is maintained at about 1500 pounds per square inch by adding ethylene from a storage cylinder. The absorption of ethylene ceases after about 1 hour, and the mixture is cooled and removed from the reactor.

The individual products are isolated as in Example I; the amount of each formed is indicated in Table V.

Table V

| No. of Carbons | Parts by Weight | Weight, Per cent |
|---|---|---|
| $C_3$ | 2.0 | 5.0 |
| $C_5$ | 9.6 | 23.8 |
| $C_7$ | 11.5 | 28.6 |
| $C_9$ | 8.8 | 21.8 |
| $>C_9$ | 8.4 | 20.8 |
|  | 40.3 | 100.0 |

EXAMPLE IV

A stainless steel shaker tube is charged with 100 parts of water, 100 parts of carbon tetrachloride, 4 parts of sodium acetoxyoctadecylsulfate, and 0.6 part of potassium persulfate. The reaction is carried out at 120° C. at an average ethylene pressure of 1500 pounds per square inch as in Example III. Distillation of the reaction product yields 52.9 parts of mixed ethylene/carbon tetrachloride reaction products having a plurality of ethylene units and one carbon tetrachloride unit per molecule.

EXAMPLE V

A high pressure reactor is charged with 200 parts of carbon tetrachloride and 0.45 part of benzoyl peroxide. The reactor is closed, pressured with ethylene, agitated, and the reaction is carried out at 120° C. under 1200–1400 pounds per square inch ethylene pressure. This pressure is maintained throughout the reaction by the addition of more ethylene from high pressure storage; the total pressure drop is about 400 pounds. The reactor is cooled, the product is discharged, stripped of carbon tetrachloride, and the residue is distilled.

The individual ethylene/carbon tetrachloride reaction products are isolated as in Example II; the amount of each formed is indicated in the following table:

Table VI

| No. of Carbons | Parts by Weight | Weight, Per cent |
|---|---|---|
| $C_3$ | 5.4 | 8.7 |
| $C_5$ | 35.6 | 57.4 |
| $C_7$ | 14.7 | 23.8 |
| $C_9$ | 4.3 | 6.9 |
| $>C_9$ | 2.0 | 3.2 |
|  | 62.0 | 100.0 |

This example illustrates a reaction, by the process of this invention in which no diluent is employed. Under the above conditions, this particular reaction can be carried out smoothly and without a temperature rise. However, certain reactions of the present invention such as, for example, those with ethylene and carbon tetrachloride and chloroform, tend to proceed quite rapidly, sometimes with explosive violence, when high ethylene pressures are used in the absence of a diluent.

EXAMPLE VI

A stainless steel reactor is charged with 200 parts of chloroform and 1.6 parts of tetraethyllead. The reactor is pressured with ethylene, agitated, and telomerization is carried out at 160° C. under 800–1200 pounds per square inch of ethylene pressure. The thylene absorption is of short duration. The reaction mixture is cooled, treated with a solution of bromine in carbon tetrachloride to destroy the excess tetraethyllead, washed with sodium bisulfite, water, dried, and distilled. The typical ethylene/chloroform reaction products $$CH_3(CH_2)_3CCl_3 \text{ and } CH_3(CH_2)_5CCl_3$$

are isolated from the reaction mixture by fractional distillation.

EXAMPLE VII

A silver-lined pressure reactor is charged with an emulsion containing 160 parts of water, 40 parts of chloroform, 0.8 part of benzoyl peroxide, and 4 parts of sodium acetoxyoctadecylsulfate, the charge occupying about 56 per cent of the total free space in the reactor. The reactor is placed in a reciprocating agitator and is pressured with ethylene to 575 atmospheres. The temperature is then raised to 95° C., at which temperature the pressure is about 965 atmospheres, whereupon a reaction sets in characterized by rapid absorption of ethylene. The pressure falls to 600 atmospheres and is maintained at 600–700 atmospheres for the duration of the reaction by admitting ethylene from a high pressure storage cylinder. A total of 750 atmospheres of ethylene is absorbed over 185 minutes at this pressure; cessation of the ethylene absorption indicates that the reaction has stopped.

The reactor is cooled, the pressure is released, and the product is transferred to a steam distillation apparatus. Steam distillation serves to remove the excess chloroform; the product remains in the distillation flask as an oil which is washed twice with hot water by decantation. On cooling, the product solidifies to a greasy solid from which the water is decanted. It is dissolved in hot toluene, and this solution is distilled first to remove the water as a binary with toluene, and finally to remove all the toluene. The last traces of toluene are removed by heating on a steam bath under diminished pressure. The product is a soft, greasy solid containing 21.86 per cent chlorine and having a molecular weight of 497. The calculated molecular weight for a trichloroparaffin with this chlorine content is 487. This shows that the product is $H(CH_2CH_2)_nCCl_3$ in which the average value of $n$ is about 13.

EXAMPLE VIII

A silver-lined pressure reactor is charged with 50 parts of water, 50 parts of methylene chloroiodide, and 0.5 part of benzoyl peroxide. It is pressured with ethylene, agitated, and the telomerization is carried out at 95° C. under 500–600 atmospheres ethylene pressure as in Example VII. The product is diluted with water, extracted with ether, dried, and distilled. The combined products from two such runs (129 parts) yields the following pure compounds:

Table VII

| Compound | B. P. | Wt., pts. | $n^{20}$ |
|---|---|---|---|
| $Cl(CH_2)_3I$ | 57°/10 mm | 16.0 | 1.5472 |
| $Cl(CH_2)_5I$ | 95°/10 mm | 20.2 | 1.5284 |
| $Cl(CH_2)_7I$ | 95°/2 mm | 19.5 | 1.5153 |
| $Cl(CH_2)_9I$ | 122°/2 mm | 10.6 | 1.5088 |
| Residue | | 34.2 | |

The structures of the $C_3$ and $C_5$ chloroiodides were established by preparing the known alpha-omega-diphthalimides by heating with potassium phthalimide. These melted at 196–197° C. and 184–185° C., respectively. It is thus established that the ethylene/methylene chloroiodide reaction gives rise to a mixture of products of the general formula $Cl(CH_2)_{2n+1}I$ where $n$ is an integer greater than one.

EXAMPLE IX

A silver-lined pressure reactor is charged with 125 parts of water, 25 parts of chloral hydrate, and 0.6 part of benzoyl peroxide, the charge occupying about ⅔ of the volume of the reactor. The reactor is evacuated to remove the major portion of the atmospheric oxygen and is pressured with 600 atmospheres of ethylene from a high pressure storage system. The reaction is conducted at 95° C. under an ethylene pressure of 850–985 atmospheres over 9.25 hours, as in Example VII. The product is isolated as in Example VII and there is obtained 21 parts of a soft, buff-colored mass containing 16.4 per cent chlorine, corresponding to an average chain length of 18 ethylene units plus the elements of one unit of chloral.

A sample of the product is oxidized by heating at 100° C. with 4 parts of concentrated sulfuric acid and 1 part of nitric acid. The resulting product is partially soluble in dilute aqueous potassium hydroxide to give a surface-active agent. This surface-active effect is due to the presence of potassium salts of long-chain chlorocarboxylic acids.

EXAMPLE X

A silver-lined pressure reactor is charged with 100 parts of water, 50 parts of 1,1,1-trichloroethane, 4 parts of sodium acetoxyoctadecylsulfate, and 0.6 part of benzoyl peroxide. The reaction is carried out at 120° C. under 860–950 atmospheres of ethylene pressure as in Example VII. The product is isolated as in Example VII and there is obtained 27.5 parts of a hard wax which contains 5.83 per cent chlorine, corresponding to an average chain length of 60.5 units of ethylene plus the elements of one unit of trichloroethane.

EXAMPLE XI

A silver-lined pressure reactor is charged with 125 parts of isooctane, 25 parts of ethyl dichloroacetate and 0.6 part of benzoyl peroxide. The process is carried out as in Example VII at 120° C. under 935–970 atmospheres ethylene pressure. The white precipitate in the reaction mixture is separated by filtration and is found to be a high molecular weight ethylene/ethyl dichloroacetate reaction product. The lower molecular weight product is isolated by evaporation of the isooctane.

EXAMPLE XII

A silver-lined pressure reactor is charged with 40 parts of dichloroacetic acid, 140 parts of dioxane, and 0.6 part of benzoyl peroxide. The process is initiated at 100° C. under 995 atmospheres ethylene pressure. The vigorous reaction which sets in is characterized by a temperature rise to 135° C. and rapid absorption of ethylene. After about an hour, the ethylene absorption has ceased and the reaction is stopped. The product is poured into 800 parts of water and the resulting precipitate is separated by filtration, washed with water, and dried over calcium chloride. It is dissolved in hot toluene, filtered, and the toluene removed by evaporation under diminished pressure. There is obtained a brown grease containing 11.6 per cent chlorine, corresponding to an average of 17.2 ethylene units plus the elements of one dichloroacetic acid unit. The product is soluble in 0.5 per cent aqueous potassium hydroxide to give a surface-active solution.

EXAMPLE XIII

A silver-lined pressure reactor is charged with 20 parts of hexachloroethane, 20 parts of isooctane, 120 parts of water, 0.4 part of sodium acetoxyoctadecylsulfate and 0.4 part of benzoyl peroxide. The reactor is agitated, pressured with ethylene, and reaction is carried out at 94–101° C. under 850–945 atmospheres of ethylene pressure as in Example VII. The product is isolated as in Example VII, and there is obtained 36.5 parts of a waxy solid which contains 19.21 per cent chlorine, corresponding to an average of 30 ethylene units plus the elements of one unit of hexachloroethane.

EXAMPLE XIV

A pressure reactor is charged with 120 parts of water, 40 parts of a mixture of tetra- and penta-chloroethylbenzenes (side chain substitution product), 4 parts of sodium acetoxyoctadecylsulfate and 0.6 part of benzoyl peroxide. The reactor is agitated, pressured with ethylene, and the reaction is carried out by the method of Example VII at 120° C. and 950–970 atmospheres ethylene pressure. The product is isolated as in Example VII and is extracted with ether to remove any residual chlorinated ethylbenzenes. There is obtained a white amorphous mixture containing 7.8 per cent chlorine.

EXAMPLE XV

A high pressure reactor is charged with 20 parts of hexachlorobenzene, 120 parts of water, 25 parts of isooctane, 4 parts of sodium acetoxyoctadecylsulfate, and 0.6 part of benzoyl peroxide. The pH of the reaction mixture is adjusted to 1.7 by the addition of aqueous hydrochloric acid. The reactor is closed, evacuated, and pressured with ethylene, and reaction is carried out after the manner of Example VII at 100–145° C. and 860–980 atmospheres for a period of 2 hours. The resulting mixture is separated from the reaction mixture by filtration. It is a white solid containing 1.57 per cent chlorine.

EXAMPLE XVI

A silver-lined pressure reactor is charged with 100 parts of boiled distilled water and 0.5 part of benzoyl peroxide. The reactor is evacuated and charged with 40 parts of trichlorofluoromethane. The reaction is carried out with ethylene at 100° C. and 205–245 atmospheres ethylene pressure as in Example VII. The product is isolated as in Example VII except that it is precipitated from the toluene solution by the addition of methanol. The resulting fluffy, white solid contains 4.83 per cent chlorine and 0.9 per cent fluorine, corresponding to an average chain length of 73 ethylene units plus the elements of one unit of trichlorofluoromethane.

EXAMPLE XVII

A silver-lined pressure reactor is charged with 40 parts of dimethyl sulfate, 100 parts of dioxane, and 0.6 part of benzoyl peroxide. The reactor is closed, evacuated, and pressured with ethylene. The reaction is carried out after the manner of Example VII: 90–120° C., 400–500 atmospheres, for 11.7 hours. After cooling, the product is precipitated by mixture with several volumes of ether and is filtered. There is obtained 33 parts of polyethylene. The filtrate is evaporated to remove the ether, leaving a brown sulfur-containing oil.

This oil is treated with 200 parts of 48 per cent hydrobromic acid in a glass apparatus so designed that the alkyl bromides formed distill with the hydrogen bromide into a separator. There is thus obtained small quantities of alkyl bromides, 60 per cent of which boil in the range of 130–230° C. and the remaining 40 per cent over 230° C. The isolation of these long-chain alkyl bromides proves that an ethylene/dimethyl sulfate reaction product containing in the molecule a plurality of ethylene units and one dimethyl sulfate unit has been formed.

EXAMPLE XVIII

A high pressure tube is charged with 100 parts of dioxane, 50 parts of ethyl orthosilicate, and 0.5 part of benzoyl peroxide. It is then evacuated and charged with ethylene to a pressure of 450 atmospheres. The reactor is then shaken and heated; when the temperature of the mixture reaches about 60° C., a rapid absorption of ethylene, accompanied by a marked rise in temperature, takes place. After the initial reaction has moderated and the temperature has dropped to 100° C., the temperature is maintained at this point, and ethylene is added from a high pressure storage tank from time to time as needed to keep the pressure within the range of 500–1000 atmospheres. After 10 hours, the tube is cooled, the excess of ethylene is bled off, and the product is discharged. The white solid product is separated by filtration and purified by dissolving in toluene, filtering while hot, and allowing the solution to cool to room temperature. The product is filtered and purified further by dissolving in hot toluene, filtering, and precipitating by the addition of methanol. It is a white solid melting at 112–113° C. It contains 1.72 per cent silica (calculated as $SiO_2$) indicating an average molecular weight of about 3500. Products of lower molecular weight, containing larger proportions of silica, are isolated from the toluene-methanol mother liquor.

EXAMPLE XIX

A mixture of 140 parts of isooctane, 20 parts of sulfuryl chloride, and 0.6 part of benzoyl peroxide is reacted with ethylene in a pressure reactor at 90° C. and 735–960 atmospheres ethylene pressure in the manner of Example VII. The residue left after steam distillation of the isooctane is a gray powder which contains both sulfur and chlorine and is soluble in hot 5 per cent sodium hydroxide to give a surface-active solution. The surface-active effect is due to the presence of $Cl(CH_2CH_2)_nSO_3Na$.

EXAMPLE XX

A mixture of 50 parts of ethyl iodide, 50 parts of oxygen-free water and 0.5 part of benzoyl peroxide is reacted with ethylene in a silver-lined pressure reactor at 95° C. and 955–990 atmospheres ethylene pressure after the manner of Example VII. The non-aqueous layer is separated from the reaction product, dried, and distilled to yield the following compounds:

*Table VIII*

| Cut | B. P. | $n^{20}$ | Reported for n-Alkyl Iodide | Per cent I |
|---|---|---|---|---|
| 1 | 64°/95 mm | 1.5001 | ($C_4$) 1.50006 | 69.56 |
| 2 | 69.5°/20 mm | 1.4938 | ($C_6$) 1.4925 | 60.44 |
| 3 | 55°/3 mm | 1.4891 | ($C_8$) 1.489 | |
| 4 | 74–74°/3 mm | 1.4888 | | |
| 5 | 84–85°/3 mm | 1.4873 | | |

Cuts 1, 2, and 3 are identified as n-butyl, n-hexyl, and n-octyl iodides, respectively. It is thus apparent that the reaction, by the process of this invention, of ethylene/ethyl iodide produces a series of products of the general formula $C_2H_5(CH_2CH_2)_nI$, where $n$ is an integer greater than one.

EXAMPLE XXI

To a cold solution of 2 parts of benzoyl peroxide and 77 parts of carbon tetrachloride is added 84 parts of liquid isobutylene. This solution is added to 480 parts of water containing 12 parts of sodium acetoxyoctadecylsulfate, and the resulting mixture is heated at 100° C. for 17 hours in a pressure reactor. The product is isolated by steam distillation. The non-steam-volatile portion is taken up in benzene and the benzene evaporated to give 18 parts of a viscous oil which contains 22.42 per cent chlorine, corresponding to an average chain length of 8.6 ethylene units plus the elements of one carbon tetrachloride unit. There is also obtained 6 parts of a lower molecular weight mixture which is steam volatile.

EXAMPLE XXII

A silver-lined pressure reactor is charged with 100 parts of water, 5 parts of carbon tetrachloride, and 5 parts of sodium bisulfite. It is then evacuated and 40 parts of propylene added from a storage cylinder. The residual oxygen in the reactor and in the propylene serves as a catalyst. The charge is then pressured with ethylene and the reaction is carried out at 95° C. under 900–1000 atmospheres of ethylene pressure as in Example VII. The product remaining after steam distillation of the reaction mixture is a white wax containing 14.35 per cent chlorine.

A similar run with isobutylene instead of propylene gives a product containing 10.70 per cent chlorine.

EXAMPLE XXIII

A silver-lined pressure reactor is charged with 40 parts of water, 10 parts of carbon tetrachloride, 6 parts of sodium acetoxyoctadecylsulfate, 0.5 part of benzoyl peroxide, and 30 parts of n-octene-1. The charge is evacuated and pressured with ethylene and the reaction is carried out at 120° C. and 900–1000 atmospheres ethylene pressure as in Example VII. The product is isolated as in Example VII and is a tan greasy mixture containing 18.51 per cent chlorine.

EXAMPLE XXIV

A silver-lined pressure reactor is charged with 60 parts of boiled water, 30 parts of styrene, and 50 parts of carbon tetrachloride. The reactor is evacuated, pressured with ethylene, and reaction is carried out at 160° C. and under 895–985 atmospheres ethylene pressure as in Example VI, the oxygen (about 250 parts per million) in the ethylene serving as catalyst. The non-steam volatile product is isolated as in Example VI. There is obtained a clear, sticky gum containing 11.99 per cent chlorine and having the composition $Cl$—$R$—$CCl_3$ in which the divalent hydrocarbon radical R is formed by condensation of ethylene and styrene.

EXAMPLE XXV

An aluminum-lined pressure reactor is charged with 63 parts of vinyl chloride, 20 parts of carbon tetrachloride, 120 parts of water, and 0.2 part of benzoyl peroxide. The reactor is agitated, pressured with ethylene, and the reaction is carried out at 65° C. under 850–980 atmospheres total pressure as in Example VII. The non-steam volatile product is isolated as in Example VII and there is obtained 47 parts of a sticky resin containing 43.30 per cent chlorine, corresponding to an average composition of ethylene/vinyl chloride/carbon tetrachloride of 9.13/4.22/1.

EXAMPLE XXVI

A mixture of 110 parts of isooctane, 20 parts of alpha, alpha'-dichlorodimethyl ether, and 0. part of benzoyl peroxide is reacted with ethylene at 120° C. and 955–970 atmospheres ethylene pressure as in Example VII. The product is isolated as in Example VII and contains 3.46 per cent chlorine, corresponding to an average chain length of 69 ethylene units.

The process of the present invention can be carried out with any polymerizable aliphatic monoolefinic hydrocarbon. The preferred members of this class are those having from 2 to carbon atoms, ethylene being especially preferred. It is preferred that the ethylenic unsaturation be at the end of the compound and preferably in the form of a vinyl group (i. e.,

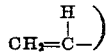

The telogens with which this invention is concerned are saturated estadrides, i. e., esters and anhydrides of inorganic acids. As examples of general classes of compounds which fall within this group, there may be mentioned halogenated derivatives of aliphatic hydrocarbons, e. g., $CCl_4$ $CCl_3F$, $CHCl_3$, $CH_2Cl_2$, $CH_2ClI$, $CH_3I$, $CH_3Br$ $CH_3Cl$, $CH_3CCl_3$, $CH_3CH_2Br$, and $CH_3CCl_2CH_3$ acids such as $Cl_3CCO_2H$, $Cl_2CHCO_2H$, $ClCH_2CO_2H$ $CH_3CHBrCO_2H$, and $CH_2Br$—$CH_2CO_2H$; esters such as $Cl_3C$—$COO$—$C_3H_7$, $Cl_2CH$—$COO$—$C_2H_5$ $ClCH_2$—$COO$—$CH_3$, $CH_3$—$CHBr$—$COO$—$C_2H_5$ and $CH_2Br$—$CH_2$—$COO$—$CH_3$; anhydrides such as $(Cl_3C$—$CO)_2O$, $(Cl_2CH$—$CO)_2O$ $(ClCH_2$—$CO)_2O$, and $(CH_3$—$CHBr$—$CO)_2O$; aldehydes such as $Cl_3CCH$=$O$
and
$ClCH_2$—$CH_2$—$CH$=$O$ alcohols such as $Cl_3CCH_2OH$, $BrCH_2CH_2OH$, $ClCH_2CHOH$—$CH_2OH$ and CH₂OH—CHCl—CH₂OH; ethers such as ClCH₂—O—CH₃, ClCH₂—O—CH₂Cl ClCH₂—CH₂—O—CH₂—CH₂Cl and

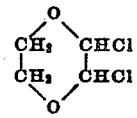

acyl halides such as CH₃COCl, CH₃COBr, ClCH₂COCl, CH₃CH₂CH₂COCl, ClCO—COCl, and COCl₂; sulfonyl halides such as C₆H₅—SO₂Cl, ClSO₃H, Cl₃C—SO₂Cl, CH₃SO₂Cl, and SO₂Cl₂; sulfur halides such as SCl₂ and S₂Cl₂; alkyl esters of inorganic acids such as (C₂H₅O)₃B, (C₂H₅O)₄Si, (C₄H₉O)₃PO, CH₃OSO₃H, (CH₃O)₂SO₂ and (CH₃O)₂SO; halogens such as Cl₂, Br₂, and I₂; and cyanogen and its halogen derivatives such as (CN)₂, BrCN, and ClCN. The preferred members of this class are halogenated organic compounds, more particularly halogenated aliphatic hydrocarbons which may be straight or branch chained or may be saturated cyclic compounds. Especially preferred in this class are halogenated derivatives of methane such as carbon tetrachloride, chloroform, trichlorofluoromethane, methylene chloroiodide, etc. Another preferred class of halogenated organic compounds are the saturated, halogenated carboxylic acids and their esters. A third preferred group is the saturated aliphatic esters of inorganic oxyacids of non-metallic elements selected from groups III–A, IV–A, V–A, and VI–A of the periodic table, especially those lying above the heavy line in the periodic table as shown by Deming (General Chemistry, second edition, published 1925 by John Wiley & Sons, Inc., New York). Of these, the preferred group is the alkyl esters of inorganic acids of sulfur, phosphorous, and silicon; more especially alkyl sulfates, phosphates, and silicates.

In order to have an estadride, i. e., an ester or anhydride, within the scope of this invention, it is not necessary that the parent compound, i. e., the acid, be an actual one; it may, in fact, be hypothetical. The following table illustrates typical estadrides, i. e., esters and anhydrides which can be used in the preparation of telomers:

Table IX

| Telogen | Hypothetical Parent Compounds |
|---|---|
| CCl₄ | C(OH)₄+HCl |
| HCCl₃ | HC(OH)₃+HCl |
| H₂CCl₂ | H₂C(OH)₂+HCl |
| H₃CCl | H₃COH+HCl |
| CH₂ClI | H₂C(OH)₂+HCl+HI |
| Cl₃CCHO | (HO)₃CCHO+HCl |
| Cl₃CCCl₃ | (HO)₃CC(OH)₃+HCl |
| (CH₃)₂SO₄ | CH₂OH+H₂SO₄ |
| SO₂Cl₂ | H₂SO₄+HCl |
| Cl₂ | HOCl+HCl |
| (CN)₂ | HOCN+HCN |
| BrCN | HOCN+HBr |
| (COCl)₂ | (COOH)₂+HCl |
| (C₂H₅O)₄Si | C₂H₅OH+H₄SiO₄ |
| Hexachlorobenzene | Hexahydroxybenzene+HCl |

It is not intended that the invention be limited in scope to telomerizations involving only polymerizable aliphatic monoolefinic hydrocarbons. For example, it is known that ethylene can be interpolymerized with a wide variety of unsaturated compounds. Among such, there may be mentioned propylene, isobutylene, styrene, and similar monoolefinic hydrocarbons; vinyl esters, such as vinyl acetate, vinyl formate, and vinyl isobutyrate; and such acids as acrylic, methacrylic, itaconic, citraconic, crotonic, maleic, and fumaric, as well as their derivative, such as esters, acid halides, and anhydrides. Other compounds which can be interpolymerized with ethylene include vinyl chloride, vinyl fluoride, tetrafluoroethylene, vinylidene chloride, vinyl cyanide, N-vinyl imides, vinyl ethers, divinyl formal, divinyl butyral, methyl vinyl ketone, and butadiene. Just as the polymerization reaction is applicable to the interpolymerization of polymerizable aliphatic monoolefinic hydrocarbons such as ethylene with other unsaturated compounds, so also is the telomerization reaction applicable to mixtures of polymerizable aliphatic monoolefinic hydrocarbons with other unsaturated compounds, such as those mentioned above, as taxogens. When more than one taxogen is used in the telomerization, the reaction is referred to as "intertelomerization."

While a mixture of telogens can be used in a telomerization reaction, this is generally undesirable because it gives a mixture of products which do not all belong to the same homologous series.

The reaction of the present invention does not occur in the absence of a telomerization catalyst, but some agents, e. g., hexachloroethane, can function as both the telogen and the telomerization catalyst. The catalysts used in the process of this invention are agents which are effective as catalysts for the polymerization of ethylene or its homologues and which agents are, at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of ethylene type compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, however, the following suitable catalysts are mentioned: peroxygen compounds, e. g., diacyl peroxides such as acetyl peroxide, propionyl peroxide, benzoyl peroxide, and lauroyl peroxide; alkali and ammonium persulfates, perborates, and percarbonates; other peroxides such as hydrogen peroxide, ascaridole, tetrahydronaphthalene peroxide, diethyl peroxide, and cyclohexanone peroxide; molecular oxygen; such metal alkyls as tetraethyllead and tetraphenyllead; ultraviolet light, especially in the presence of such photosensitizers as mercury, alkyl iodides, benzoin, and acetone; amine oxides, e. g., trimethylamine oxide, triethylamine oxide, and dimethylaniline oxide; dibenzoylhydrazine; hydrazine salts such as hydrazine dihydrochloride and hydrazine sebacate; and hexachloroethane. The catalyst is used in amounts varying from about 0.0001 to 1.0 per cent by weight of the telogen, the preferred range in the case of the peroxygen catalysts being 0.05 to 0.5 per cent.

Of this group of catalysts, it is preferred to use peroxygen compounds, especially the diacyl peroxides and the alkali and ammonium persulfates. The other member of the preferred group of catalysts is molecular oxygen, which may be considered a special case of this group. It should be emphasized, however, that, to be effective as a catalyst, molecular oxygen should be present in small quantity, such as, for example, less than 1000 parts per million. As is generally the case in peroxygen catalyzed vinyl polymerizations, oxygen in larger quantities than this has a deleterious effect upon the reaction.

The process of this invention can be carried out over a wide range of temperatures, from room temperature to over 250° C. In fact, the upper temperature limit for the process of this invention is determined only by the thermal stability of the various compounds in the reacting system. The preferred temperature for any given process of this invention depends primarily on the catalyst and the telogen being employed. For the majority of cases, the preferred reaction temperature lies somewhere in the range of 60–150° C. The preferred catalysts, such as the diacyl peroxides and the persulfates, are generally employed in this temperature range, and the preferred classes of telogens react satisfactorily under such conditions. High temperatures are generally employed only with less active esters and anhydrides and catalysts which are more heat stable than those of the preferred class. Processes with less active catalysts and less active esters and anhydrides sometimes require temperatures of the order of 150–250° C.

Superatmospheric pressure is generally desirable for the process of the present invention. This is particularly true in the present invention since, in the preferred embodiments, the olefin is a gas, and it is essential to maintain superatmospheric pressure in order to achieve an appreciable concentration of the olefin in the system. This is not absolutely essential, however, and reactions of the present invention can be carried out at atmospheric pressure. On the other hand, successful reactions can be run as high as 2000 atmospheres pressure, and the ultimate pressure limit for the reaction is only that which the equipment available will stand. The preferred pressure range for the majority of reactions of the present invention is 20–1000 atmospheres.

The ratio of ester or anhydride to olefine used in the process of this invention can be varied widely. In general, increasing the ratio of ester or anhydride to olefine decreases the average molecular weight of the product. The preferred molecular ratio of ester or anhydride to olefine will depend upon the nature of the reactants and the chain length of the product desired, but will generally be in the range of 10:1 to 1:10. It must be emphasized that, especially in the case of ethylene, which is a gas, the average chain length of the product, i. e., the number of ethylene units, is a function of the concentration of ethylene which is maintained in the reaction system, and that this is, in turn, dependent on the reaction pressure. Moreover, the average chain length of the product in a given reaction also depends on the nature of the ester or anhydride employed, some esters and anhydrides being more active than others. In the final analysis, then, the reaction pressure employed for a given system will depend upon the chain length of product desired and upon the particular ester or anhydride which is used.

The reaction can be carried out with only the reactants and the catalyst present in the reaction zone, as, for example, in Examples V and VI. Since the reaction is exothermic and, under some conditions, proceeds with explosive violence, it is desirable, in most cases, to have present an inert diluent which will act to decrease the violence of the reaction and absorb some of the heat. The inert diluent can be a gas such as nitrogen, but, in general, a liquid diluent is used. In many instances, water is a suitable and satisfactory diluent. This is especially true where the olefin is gaseous under conditions of the reaction and the ester or anhydride is stable towards water. Inert organic solvents can be used either in place of the water or in addition to the water. It is clear that when the process is carried out in the absence of diluents, the process of this invention, in some respects, is similar to massive polymerization. When an inert solvent is used, the conditions are somewhat similar to so-called solution polymerization.

It has been demonstrated (see Example IV) that a solvent, such as isooctane, serves the same purpose as increased pressure in increasing the average chain length of a given product for a given reaction system when the olefine is a gas which is used to maintain the reaction pressure; that is, when one of the reactants is a gas, such as ethylene, it is possible, by the use of a solvent for ethylene, to increase the relative concentration of ethylene with respect to ester or anhydride, and thereby to effect the same result as is brought about by an increase in pressure. As suitable solvents, it is preferred to use relatively low-boiling liquids which are relatively inert under the reaction conditions and which necessarily do not fall in the classification of esters or anhydrides. Among such materials, there may be mentioned aliphatic hydrocarbons, cycloaliphatic hydrocarbons, aliphatic ethers, and cycloaliphatic ethers such as dioxane. Less desirable, although operable, are aromatic hydrocarbons.

The process can also be carried out under conditions similar to emulsion polymerization. Thus, when water is used as an inert diluent, there can be present also a surface-active agent which will aid in dispersing the reactants in the aqueous system. The reactants can be so dispersed regardless of their phase (gaseous, liquid, or solid).

While the invention is not limited to any particular emulsifying agent, such compounds as soluble salts of quaternary ammonium bases which contain at least one long-chain aliphatic group such, for example, as cetyl and octadecyl trimethyl ammonium bromide, diethylamino ethyl oleyl amide hydrochloride, and octadecyl betaine; the soluble salts of sulfate esters of long chain aliphatic alcohols, such as the sodium salt of cetyl, octadecyl, or acetoxyoctadecyl sulfate; the alkali metal salts of sulfonated unsaturated hydrocarbons, such as sodium salt of abietene sulfonic acid; the alkali metal salts of alkyl naphthalene sulfonic acids; etc. are operative. However, the use of surface-active agents is entirely optional. While the use of these agents may be desirable in some cases, they are not generally necessary and they sometimes lead to complications in purifying products.

The pH of the reaction mixture is, in general, determined only by certain special requirements which may be obtained for a given system. For example, it has been found that the ethylene/carbon tetrachloride reaction, in an unbuffered system, generally becomes more acidic as the reaction progresses. However, it is possible, by the use of a buffer such as sodium bicarbonate, to maintain an alkaline pH during the entire reaction without any effect on the course of the reaction. Certain pH-sensitive esters and anhydrides, of course, may require a buffered system. In those cases in which the ester or anhydride is water sensitive, and no water is employed, pH is naturally not a factor.

Although, as has been mentioned above, oxygen in small concentrations can, in the absence of other agents, act as a catalyst for the reaction, its presence in larger quantities is to be scrupulously avoided. This is in agreement with the now generally accepted fact that, in any peroxygen catalyzed vinyl polymerization, oxygen in appreciable quantities has a deleterious effect, not only upon yield, but, in many cases, upon the quality of the product produced. Likewise, in reactions of the present invention, it is preferred to reduce the oxygen content of the reaction system to a practical minimum.

The reaction can be carried out in any kind of pressure equipment made of, or lined with, materials capable of withstanding moderate corrosive attack. Such lining materials as stainless steel, silver, nickel, and aluminum, have been found to be particularly useful, although chromvanadium steel can be used. Many other corrosion resistant alloys are, of course, applicable.

It is sometimes desirable to add one or both of the reactants to the system as the reaction progresses. This can be done by injection of the vapor or liquid into the reaction system by well known means. It is also feasible to add a catalyst to the system as the reaction progresses. This can be accomplished, for example, by injecting a solution of the catalyst in one of the reactants or in an inert solvent. This procedure is especially advantageous in those cases where the reaction takes place very rapidly. In such instances, portionwise or slow-continuous addition of the catalyst to the system facilitates the control of the reaction and generally leads to higher yields.

It is within the scope of this invention to carry out the reactions of this invention in a continuous flow system. For example, a mixture of reactants and catalyst can be passed continuously through a zone which is under telomerization conditions. Alternatively, the catalyst can be injected into the system which is passing through the reaction zone. In some cases, advantage may be derived by adding one of the reactants to the mixture in the reaction zone. This is especially true when the reaction is so rapid as to cause a marked change in concentration in one of the reactants. Continuous operation possesses many technical advantages such as economy of operation, accurate control of the reaction, and flexibility of operation. By continuous operation, a constant ratio of reactants can be maintained during the reaction if so desired.

It is apparent from the very broad nature of this invention and the multiplicity of products which can be obtained that a very large number of uses are open to these products. By way of illustration, the mixture of low molecular weight chlorinated hydrocarbons produced by the reaction, by the process of this invention, of ethylene and carbon tetrachloride or chloroform can be used as a solvent, a heat transfer medium, and, in some cases, as a plasticizer. The higher molecular weight waxy products produced at higher pressures, or from other esters and anhydrides, can be used as wax substitutes, coating materials, lubricating oil adjuvants, etc. Again, the low molecular weight products can be separated into their individual components by fractional distillation, and these are very useful as intermediates for a wide variety of syntheses. For example, it is disclosed in copending application Serial No. 438,467, filed April 10, 1942, now Patent 2,398,430, dated April 16, 1946, that these can be hydrolyzed to the corresponding omega-chloroaliphatic acids, thus giving rise to a series of intermediates containing dissimilar functional groups at opposite ends of a normal aliphatic chain.

It is apparent that many widely different embodiments of this invention may be made without departing from the spirit and scope thereof, and, therefore, it is not intended to be limited except as indicated in the appended claims.

We claim:

1. Process for the preparation of compounds having in the molecule thereof the components of a plurality of molecules of ethylene and the components of one molecule of carbon tetrachloride which comprises subjecting a reaction mass comprising ethylene and carbon tetrachloride at an ethylene pressure of from 20 to 1000 atmospheres to a temperature of 60° C. to 150° C. and the action of benzoyl peroxide as a catalyst.

2. Process for the preparation of compounds having in the molecule thereof the components of a plurality of molecules of ethylene and the components of one molecule of carbon tetrachloride which comprises subjecting a reaction mass comprising ethylene and carbon tetrachloride at an ethylene pressure of from 20 to 1000 atmospheres to a temperature of 60° C. to 150° C. and the action of a peroxygen compound as a catalyst.

3. Process for the preparation of compounds having in the molecule thereof the components of a plurality of molecules of ethylene and the components of one molecule of a chlorinated methane which comprises subjecting a reaction mass comprising ethylene and a chlorinated methane at an ethylene pressure of from 20 to 1000 atmospheres to a temperature of 60° C. to 150° C. and the action of a peroxygen compound as a catalyst.

4. Process for the preparation of compounds having in the molecule thereof the components of a plurality of molecules of ethylene and the components of one molecule of a chlorinated alkane which comprises subjecting a reaction mass comprising ethylene and a chlorinated alkane at an ethylene pressure of from 20 to 1000 atmospheres to a temperature of 60° C. to 150° C. and the action of a peroxygen compound as a catalyst.

5. Process for the preparation of compounds having in the molecule thereof the components of a plurality of molecules of ethylene and the components of one molecule of a halogenated methane containing a halogen of the class consisting of chlorine, bromine, and iodine which comprises subjecting a reaction mass comprising ethylene and the halogenated methane at an ethylene pressure of from 20 to 1000 atmospheres to a temperature of 60° C. to 150° C. and the action of a peroxygen compound as a catalyst.

6. A process for the preparation of compounds having in the molecule thereof the components of a plurality of molecules of a polymerizable monoolefinic aliphatic hydrocarbon and the components of one molecule of carbon tetrachloride which comprises subjecting a reaction mass comprising a polymerizable monoolefinic aliphatic hydrocarbon and carbon tetrachloride at a pressure of the olefine of 20 to 1000 atmospheres to a temperature of 60° C. to 150° C. and the action of benzoyl peroxide as a catalyst.

7. A process for the preparation of compounds having in the molecule thereof the components of a plurality of molecules of a polymerizable monoolefinic aliphatic hydrocarbon and the components of one molecule of carbon tetrachloride which comprises subjecting a reaction mass comprising a polymerizable monoolefinic aliphatic hydrocarbon and carbon tetrachloride at a pressure of the olefine of 20 to 1000 atmospheres to a temperature of 60° C. to 150° C. and the action of a peroxygen compound as a catalyst.

8. A process for the preparation of compounds having in the molecule thereof the components of a plurality of molecules of a polymerizable monoolefinic aliphatic hydrocarbon and the components of one molecule of a chlorinated methane which comprises subjecting a reaction mass comprising a polymerizable monoolefinic aliphatic hydrocarbon and the chlorinated methane at a pressure of the olefine of 20 to 1000 atmospheres to a temperature of 60° C. to 150° C. and the action of benzoyl peroxide as a catalyst.

9. A process for the preparation of compounds having in the molecule thereof the components of a plurality of molecules of a polymerizable monoolefinic aliphatic hydrocarbon and the components of one molecule of a chlorinated methane which comprises subjecting a reaction mass comprising a polymerizable monoolefinic aliphatic hydrocarbon and the chlorinated methane at a pressure of the olefine of 20 to 1000 atmospheres to a temperature of 60° C. to 150° C. and the action of a peroxygen compound as a catalyst.

10. A process for the preparation of compounds having in the molecule thereof the components of a plurality of molecules of a polymerizable monoolefinic aliphatic hydrocarbon and the components of one molecule of a halogenated methane containing a halogen of the class consisting of chlorine, bromine, and iodine which comprises subjecting a reaction mass comprising a polymerizable monoolefinic aliphatic hydrocarbon and a halogenated methane at a pressure of the olefine of 20 to 1000 atmospheres to a temperature of 60° C. to 150° C. and the action of a peroxygen compound as a catalyst.

11. A process for preparing compounds having in the molecule thereof the components of a plurality of molecules of ethylene and the components of one molecule of chloroform which comprises subjecting to a pressure of 20 to 1000 atmospheres, a temperature of 60° C. to 150° C. and the action of a peroxygen compound as a catalyst and in the presence of an inert diluent a reaction mass consisting of ethylene and chloroform.

12. A compound of the formula $$X\text{—}(CH_2\text{—}CH_2)_n\text{—}CX_3$$

wherein X is halogen of the class consisting of chlorine, bromine and iodine and $n$ is an integer greater than unity.

13. A compound of the formula $$Cl\text{—}(CH_2\text{—}CH_2)_n\text{—}CCl_3$$

wherein $n$ is an integer greater than unity.

14. Process for the preparation of reaction products having in the molecule thereof the components of a plurality of ethylene molecules and the components of one molecule of a saturated aliphatic halogenated hydrocarbon containing a halogen of the class consisting of chlorine, bromine, and iodine, which comprises subjecting a reaction mass comprising ethylene and the saturated aliphatic halogenated hydrocarbon at temperature between 60° C. and 150° C. and at superatmospheric pressure to the action of a peroxygen compound as a catalyst.

15. A process for the preparation of compounds having in the molecule thereof the components of a plurality of molecules of a polymerizable monoolefinic aliphatic hydrocarbon having from two to four carbon atoms and the components of one molecule of carbon tetrachloride which comprises subjecting a reaction mass comprising the polymerizable monoolefinic aliphatic hydrocarbon and carbon tetrachloride at a pressure of the olefine of 20 to 1000 atmospheres to a temperature of 60° C. to 150° C. and the action of a peroxygen compound as a catalyst.

16. A process for the preparation of compounds having in the molecule thereof the components of a plurality of molecules of a polymerizable monoolefinic aliphatic hydrocarbon having from two to four carbon atoms and the components of one molecule of a chlorinated methane which comprises subjecting a reaction mass comprising the polymerizable monoolefinic aliphatic hydrocarbon and the chlorinated methane at a pressure of the olefine of 20 to 1000 atmospheres to a temperature of 60° C. to 150° C. and the action of benzoyl peroxide as a catalyst.

17. A process for the preparation of compounds having in the molecule thereof the components of a plurality of molecules of a polymerizable monoolefinic aliphatic hydrocarbon having from two to four carbon atoms and the components of one molecule of a chlorinated methane which comprises subjecting a reaction mass comprising the polymerizable monoolefinic aliphatic hydrocarbon and the chlorinated methane at a pressure of the olefine of 20 to 1000 atmospheres to a temperature of 60° C. to 150° C. and the action of a peroxygen compound as a catalyst.

18. A process for the preparation of compounds having in the molecule thereof the components of a plurality of molecules of a polymerizable monoolefinic aliphatic hydrocarbon having from two to four carbon atoms and the components of one molecule of a halogenated methane containing a halogen of the class consisting of chlorine, bromine, and iodine which comprises subjecting a reaction mass comprising the polymerizable monoolefinic aliphatic hydrocarbon and the halogenated methane at a pressure of the olefine of 20 to 1000 atmospheres to a temperature of 60° C. to 150° C. and the action of a peroxygen compound as a catalyst.

19. A process for the preparation of compounds having in the molecule thereof the components of a plurality of molecules of a polymerizable monoolefinic aliphatic hydrocarbon and the components of one molecule of a halogenated alkane containing a halogen of the class consisting of chlorine, bromine, and iodine which comprises subjecting a reaction mass comprising the polymerizable monoolefinic aliphatic hydrocarbon and said halogenated alkane at a pressure of the olefine of 20–1000 atmospheres to a temperature of 60° C. to 150° C. and the action of a peroxygen compound as a catalyst.

20. Process for the preparation of reaction products having in the molecule thereof the components of a plurality of molecules of a polymerizable monoolefinic, aliphatic hydrocarbon and the components of one molecule of a saturated aliphatic halogenated hydrocarbon containing a halogen of the class consisting of chlorine, bromine, and iodine, which comprises subjecting a reaction mass comprising said hydrocarbon and said halogenated hydrocarbon at a temperature between 60° C. and 150° C. and at super-atmospheric pressure to the action of a peroxygen compound as a catalyst.

WILLIAM E. HANFORD.
ROBERT M. JOYCE, JR.

REFERENCES CITED

The following references are of record in the file of this patent:

UNITED STATES PATENTS

| Number | Name | Date |
|---|---|---|
| 1,898,522 | Bock et al. | Feb. 21, 1933 |
| 2,063,133 | Tropsch | Dec. 8, 1936 |
| 2,068,016 | Gayer | Jan. 19, 1937 |
| 2,068,772 | Sixt | Jan. 26, 1937 |
| 2,131,196 | Schneider | Sept. 27, 1938 |
| 2,179,218 | Levine et al. | Nov. 7, 1939 |
| 2,201,306 | Subkow | May 21, 1940 |
| 2,209,000 | Nutting et al. | July 23, 1940 |
| 2,219,260 | Horney | Oct. 22, 1940 |
| 2,255,605 | Windecker et al. | Sept. 9, 1941 |
| 2,342,400 | Hopff et al. | Feb. 22, 1944 |

FOREIGN PATENTS

| Number | Country | Date |
|---|---|---|
| 261,689 | Germany | July 2, 1913 |
| 503,205 | Great Britain | Mar. 30, 1939 |
| 503,615 | Great Britain | Apr. 11, 1939 |
| 824,909 | France | Feb. 18, 1938 |

OTHER REFERENCES

Van Tassell, "Natuurwetanschappelijk Tijdschrift," vol. 20, pages 83–5 (Antwerp, 1938).

Breitenbach, "Zeit. Phys. Chem.," vol. A187 (1940).

Joris et al., "Bulletin de la Societe Chimique de Belgique," vol. 47, pages 135–147 (1938).